US010562629B2

(12) United States Patent
Marquet et al.

(10) Patent No.: US 10,562,629 B2
(45) Date of Patent: Feb. 18, 2020

(54) SCREEN SUPPORT CONFIGURED FOR ATTACHMENT TO A BACKREST OF A SEAT

(71) Applicants: Airbus Operations SAS, Toulouse (FR); AIRBUS SAS, Blagnac (FR)

(72) Inventors: Gilles Marquet, Toulouse (FR); Marc Audibert, Brax (FR); Damien Thabault, Toulouse (FR); Christophe Harlay, Toulouse (FR)

(73) Assignees: AIRBUS OPERATIONS SAS, Toulouse (FR); AIRBUS SAS, Blagnac (FR)

( * ) Notice: Subject to any disclaimer, the term of this patent is extended or adjusted under 35 U.S.C. 154(b) by 0 days.

(21) Appl. No.: 15/954,713

(22) Filed: Apr. 17, 2018

(65) Prior Publication Data
US 2018/0305021 A1    Oct. 25, 2018

(30) Foreign Application Priority Data

Apr. 21, 2017    (FR) ..................................... 17 53487

(51) Int. Cl.
| | |
|---|---|
| *B64D 11/06* | (2006.01) |
| *B64D 11/00* | (2006.01) |
| *B60R 11/02* | (2006.01) |
| *B60N 2/879* | (2018.01) |
| *F16B 2/10* | (2006.01) |
| *B60N 2/90* | (2018.01) |

(52) U.S. Cl.
CPC ........ *B64D 11/00152* (2014.12); *B60N 2/879* (2018.02); *B60R 11/02* (2013.01); *B60N 2002/905* (2018.02); *F16B 2/10* (2013.01)

(58) Field of Classification Search
CPC .......... B64D 11/0015; B64D 11/00152; B60N 2/879; B60N 2002/905; B60R 11/02; B60R 11/0229; B60R 11/0235; F16B 2/10
See application file for complete search history.

(56) References Cited

U.S. PATENT DOCUMENTS

| | | | | |
|---|---|---|---|---|
| 8,730,413 | B2* | 5/2014 | Tranchina | ........... B60R 11/0235 348/837 |
| 8,733,831 | B2* | 5/2014 | Brawner | ............. B60R 11/0229 297/188.05 |
| 2006/0032996 | A1 | 2/2006 | Wu | |

(Continued)

FOREIGN PATENT DOCUMENTS

| | | |
|---|---|---|
| DE | 19943696 | 3/2001 |
| EP | 1722148 | 11/2006 |

OTHER PUBLICATIONS

French Search Report, dated Jan. 9, 2018, priority document.

*Primary Examiner* — Philip F Gabler
(74) *Attorney, Agent, or Firm* — Greer, Burns & Crain, Ltd.

(57) ABSTRACT

A screen support configured to attach a screen to a seat equipped with a rear enclosure and including an attachment system configured to clamp the rods of a headrest of the seat, a support system including a limb connected to the attachment system and at least one support runner connected to the limb and configured to bear against the rear enclosure, and an engagement system configured to permit the temporary attachment of a screen and connected to the third limb.

18 Claims, 2 Drawing Sheets

(56) References Cited

U.S. PATENT DOCUMENTS

| | | | |
|---|---|---|---|
| 2006/0255224 A1* | 11/2006 | Hsiung | B60R 11/02 248/316.1 |
| 2014/0015289 A1* | 1/2014 | Fan | B60N 3/004 297/188.05 |
| 2016/0176357 A1* | 6/2016 | Maslakow | F16M 13/02 224/275 |

* cited by examiner

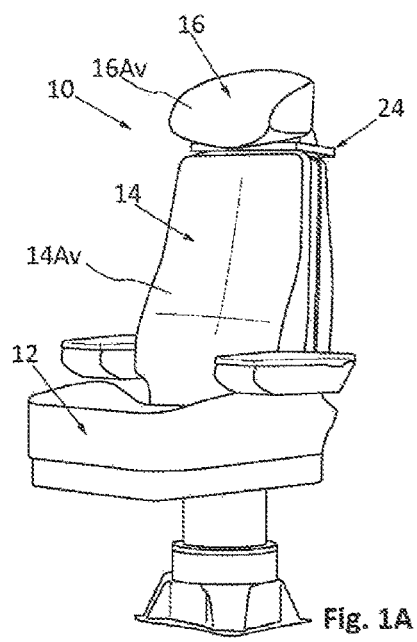
Fig. 1A
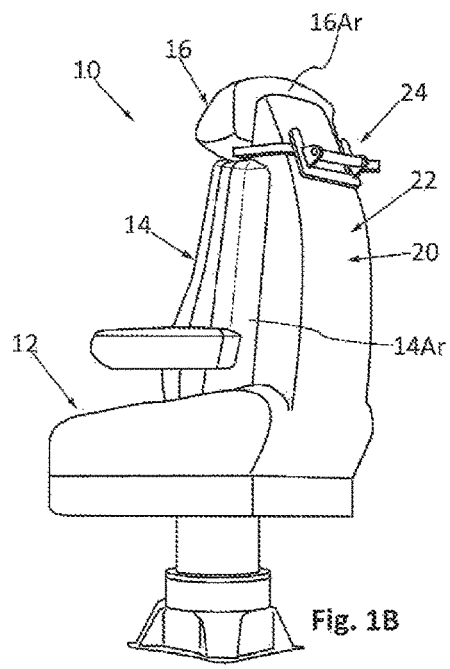
Fig. 1B
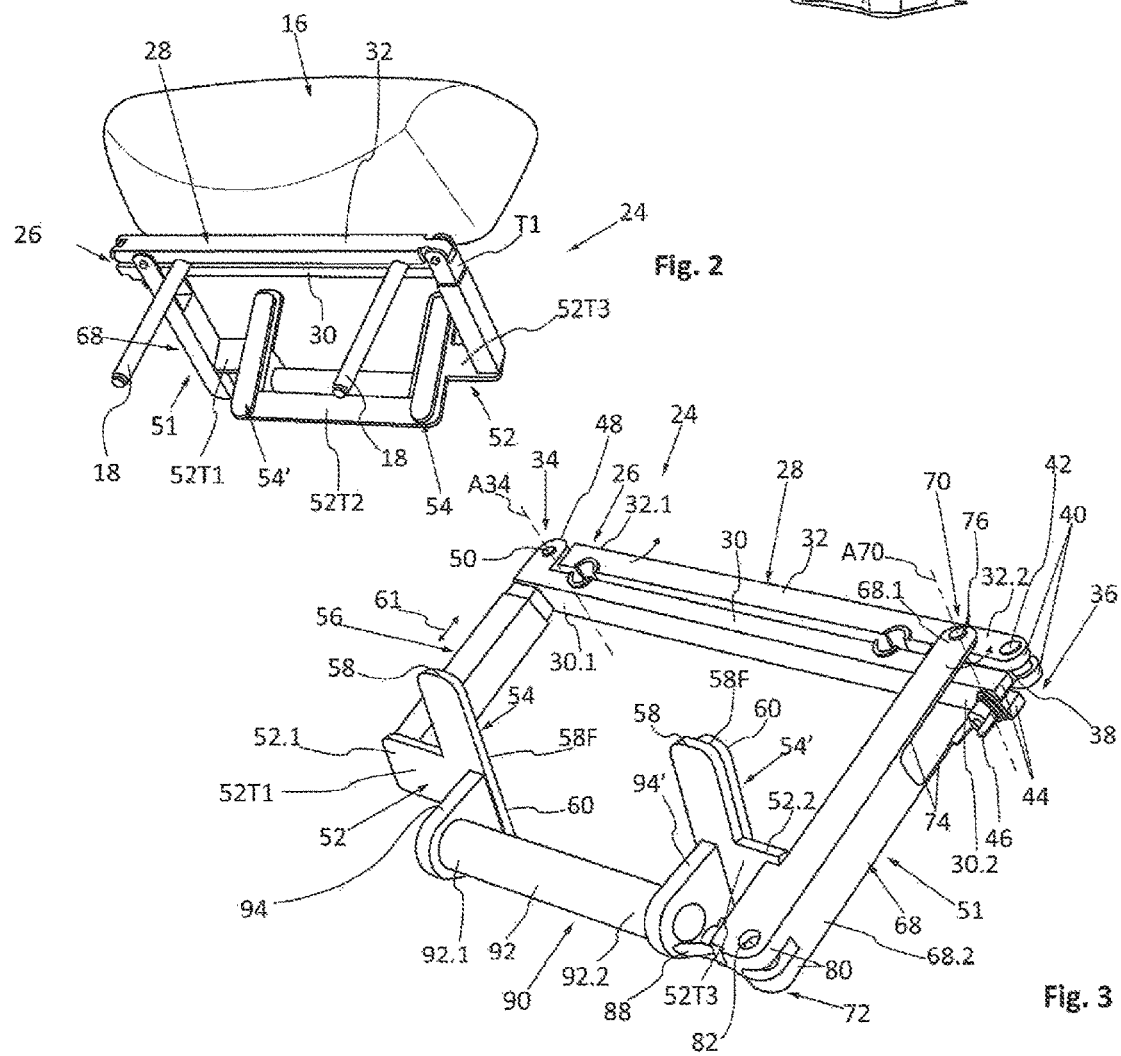
Fig. 2
Fig. 3

SCREEN SUPPORT CONFIGURED FOR ATTACHMENT TO A BACKREST OF A SEAT

CROSS-REFERENCES TO RELATED APPLICATIONS

This application claims the benefit of the French patent application No. 1753487 filed on Apr. 21, 2017, the entire disclosures of which are incorporated herein by way of reference.

BACKGROUND OF THE INVENTION

The present application relates to a screen support configured for attachment to a backrest of a seat.

According to one embodiment, an aircraft seat comprises a seat cushion and a backrest surmounted by a headrest. In order to permit its adjustment in height, the headrest comprises two rods which slide in sleeves that are present in the backrest. The seat also comprises a rear enclosure which covers the back of the backrest and at least partially the rear surface of the headrest. In certain aircraft cabins, the rear enclosure includes a screen.

When the rear enclosure does not include a screen, and if the person positioned to the rear of the seat wishes to view a screen, they must hold it with their hands. This solution is not satisfactory.

A screen support permitting the attachment of a screen to the rear of a seat in a temporary manner is known in the automobile field. According to one embodiment, the screen support comprises a clamp exhibiting two limbs configured to clamp the rods of the headrest, a pivoting link which connects the first extremities of the two limbs, and a closing mechanism configured to adopt a first attached state in which the closing mechanism connects the second extremities of the two limbs and a second detached state in which the closing mechanism permits the two limbs to move apart. In order to attach the screen, the screen support also comprises an engagement system that is integral with one of the two limbs and is configured to permit a screen to be attached temporarily.

This type of screen support is not entirely satisfactory because it does not permit the stable retention of the screen. Furthermore, it may only be utilized with difficulty on an aircraft seat because of the presence of the rear enclosure which interferes with the engagement system.

SUMMARY OF THE INVENTION

An aim of the present invention is to propose a screen support adapted to the seats of an aircraft cabin and permitting the retention of a screen in a stable manner.

For this purpose, the invention has as an object a screen support adapted for the attachment of a screen to a seat equipped with a rear enclosure and including:

an attachment system configured to clamp the rods of a headrest of the seat and which comprises:
  first and second limbs comprising first and second extremities,
  a first articulation which connects the first extremities of the limbs,
  a first closing mechanism configured to adopt an attached state in which the first closing mechanism connects the second extremities of the first and second limbs and a detached state in which the first closing mechanism permits the first and second limbs to move apart, and
an engagement system configured to permit the temporary attachment of a screen.

According to the invention, the screen support comprises a support system which includes a third limb connected to the attachment system and at least one support runner connected to the third limb and configured to bear against the rear enclosure, the engagement system being connected to the third limb.

The presence of the one or more support runner(s) provides a more stable retention of the screen support on the seat. The fact that the engagement system is connected to the third limb, and not to the attachment system, enables it to be mounted on a seat equipped with a rear enclosure.

According to another characterizing feature, the screen support comprises a cross member that is adjustable in length and which connects the third limb and the first limb of the attachment system.

According to another characterizing feature, the third limb has a length equal to or greater than the width of the seat, and the support system comprises:
  a second cross member which exhibits a first extremity and a second extremity,
  a second articulation which connects the first extremity of the second cross member and the second extremity of one of the first and second limbs,
  a second closing mechanism configured to adopt an attached state in which the second closing mechanism connects the second extremity of the cross member and the second extremity of the third limb and a detached state in which the second closing mechanism permits the second extremity of the second cross member and the second extremity of the third limb to move apart.

According to another characterizing feature, each support runner comprises a rigid plate which exhibits a contact surface oriented towards the rear enclosure and a coating which at least partially covers the contact surface and which is made of a soft material in order not to mark the rear enclosure and adopt its forms.

According to another characterizing feature, each support runner is rectangular and is oriented in such a way that its large side is perpendicular to the third limb.

According to another characterizing feature, the screen support comprises first and second support runners that are disposed equidistantly from the first and second extremities of the third limb moved as far apart as possible.

According to another characterizing feature, the third limb comprises a first portion which extends from the first extremity of the third limb as far as the first support runner, a second portion which extends from the first support runner as far as the second support runner and a third portion which extends from the second support runner as far as the second extremity of the third limb. The first and third portions are substantially in alignment and are connected equidistantly from the upper and lower extremities of the support runners, the second portion being offset in relation to the first and third portions and being connected to the lower extremities of the support runners.

According to another characterizing feature, the engagement system comprises a cylinder which exhibits first and second extremities as well as first and second lugs which connect respectively the first and second extremities and the first and second support runners.

The invention also has as its object an aircraft seat comprising a screen support according to one of the preceding characterizing features.

BRIEF DESCRIPTION OF THE DRAWINGS

Other characterizing features and advantages will emerge from the following description of the invention, which description is given only by way of example, having regard for the accompanying drawings, in which:

FIG. 1A is a perspective view from the front of an aircraft seat equipped with a screen support which illustrates one embodiment of the invention, FIG. 1B is a perspective view from the rear of the aircraft seat visible in FIG. 1A, FIG. 2 is a perspective view of a screen support attached to rods of a headrest which illustrates one embodiment of the invention, FIG. 3 is a perspective view of the screen support visible in FIG. 2 without the rods of the headrest.

DETAILED DESCRIPTION OF THE PREFERRED EMBODIMENTS

Figure 4:
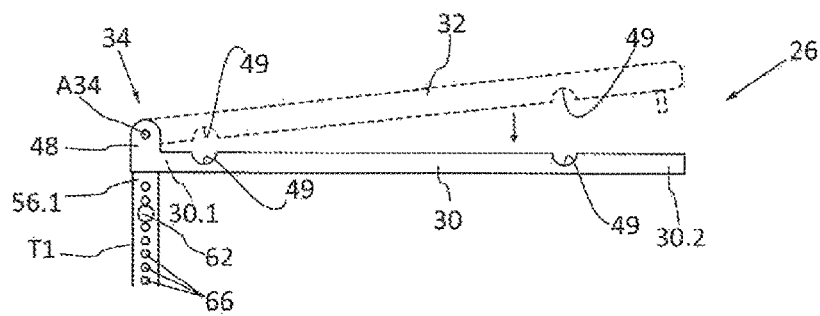
FIG. 4 is a view from above of a part of a system for the attachment of the screen support visible in FIG. 2.

According to one embodiment visible in FIGS. 1A and 1B, an aircraft seat 10 comprises a seat cushion 12 and a backrest 14 surmounted by a headrest 16. The headrest 16 comprises at least two rods 18 (visible in FIG. 2) which slide in sleeves that are present in the backrest 14 in order to permit the adjustment in height of the headrest 16. The backrest 14 and the headrest 16 comprise front surfaces 14Av and 16Av (visible in FIG. 1A) configured to receive a person and rear surfaces 14Ar and 16Ar opposite the front surfaces 14Av and 16Av. The seat 10 also comprises a rear enclosure 20 configured to cover the rear surface 14Ar of the backrest 14 and at least partially the rear surface 16Ar of the headrest 16.

The rear enclosure 20 comprises an internal surface (not visible) oriented towards the backrest 14 and the headrest 16 and an external surface 22 opposite the internal surface.

The seat 10 is equipped with a screen support 24 configured to attach a screen temporarily on the seat 10.

The screen support 24 comprises an attachment system 26 configured to join the screen support to the rods 18 of the headrest 16.

This attachment system 26 comprises a clamp 28 which includes first and second limbs 30 and 32 that are substantially rectilinear. The first and second limbs 30 and 32 comprise first extremities 30.1 and 32.1 that are connected by a first articulation 34 which exhibits a first pivot axis A34 perpendicular to the first and second limbs 30 and 32, and second extremities 30.2 and 32.2. The attachment system 26 also comprises a first closing mechanism 36 configured to adopt an attached state in which the first closing mechanism 36 connects the second extremities 30.2 and 32.2 of the two limbs 30 and 32 and a detached state in which the first closing mechanism 36 permits the two limbs 30 and 32 to move apart.

According to one embodiment, the first closing mechanism 36 comprises:

a threaded rod 38, a first yoke 40 provided at the second extremity 32.2 of the second limb 32, an axis of rotation 42 mounted pivotably on the first yoke 40, parallel to the first pivot axis A34 and attached to a first extremity of the threaded rod 38, a fork 44 provided at the second extremity 30.2 of the first limb 30 and configured to house the threaded rod 38, and a nut 46 configured to be screwed onto the threaded rod 38 and to retain the closing mechanism 36 in the attached state.

According to one embodiment, the first articulation 34 comprises a yoke 48 provided at the first extremity 30.1 of the first limb 30 and configured to house the first extremity 32.1 of the second limb 32, as well as a cylinder 50 which forms the first pivot axis A34 and which is mounted pivotably in cylindrical seats provided at the level of the yoke 48 and of the first extremity 32.1 of the second limb 32.

Of course, the invention is not limited to these embodiments for the first articulation 34 and the first closing mechanism 36.

According to another characterizing feature, the first articulation 34 and the first and second limbs 30 and 32 are configured in order for the first and second limbs 30 and 32 to be closely spaced in the attached state. In addition, each first and second limb 30 and 32 comprises, for each rod 18 of the headrest 16, a cutout 49 in the form of a semi-cylinder configured to house partially one of the rods 18. This solution provides the more stable retention of the screen support 24 on the seat 10. According to one configuration, these cutouts 49 comprise a coating in order to limit the risks of damage to the rods 18.

According to another characterizing feature, the screen support 24 comprises a support system 51 which includes a third limb 52 connected to the attachment system 26 and at least one support runner 54 connected to the third limb 52 and configured to bear against the rear enclosure 20. The presence of this support runner 54 provides the more stable retention of the screen support 24 on the seat 10.

The third limb 52 is approximately parallel to the first limb 30 and is connected to this first limb 30 by a first cross member 56 which exhibits a first extremity 56.1 connected to the first limb 30 and a second extremity 56.2 connected to the third limb 52.

According to one embodiment, each support runner 54 comprises a rigid plate 58 which exhibits a contact surface 58F oriented towards the rear enclosure 20 and a coating 60 which covers at least partially the contact surface 58F and which is made of a soft material in order not to mark the rear enclosure 20 and to adopt its forms. According to one configuration, each support runner 54 is rectangular and is oriented in such a way that its large side is perpendicular to the third limb 52, which corresponds to a vertical orientation in operation. This configuration reinforces the stability of the screen support 24.

According to another characterizing feature, the first cross member 56 is adjustable in length in order to permit the adaptation of the screen support 24 to different dimensions of the rear enclosure 20.

Figure 5:
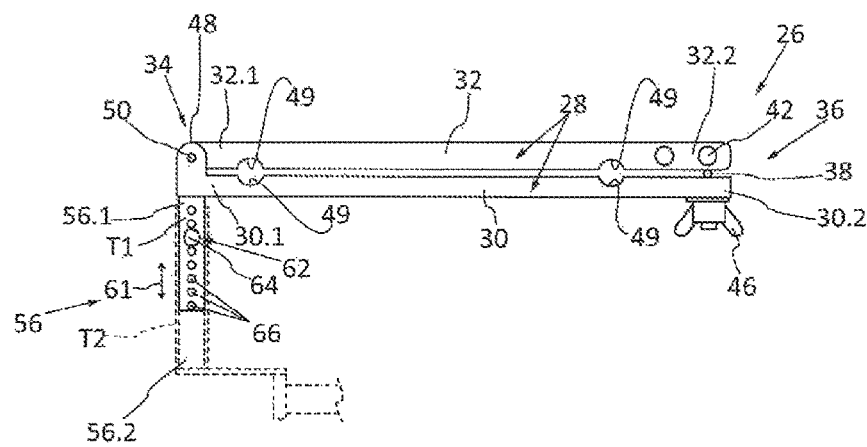
FIG. 5 is a view from above of the system for the attachment of the screen support visible in FIG. 2.
Figure 6:
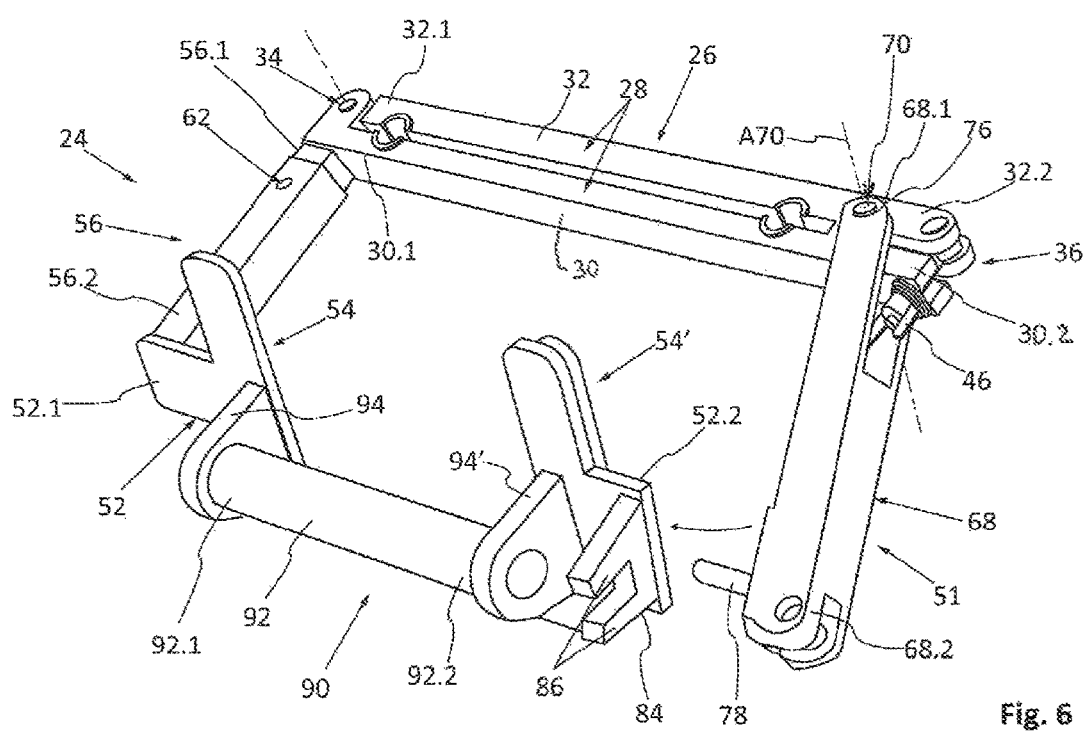
FIG. 6 is a perspective view of the systems for the attachment and retention of the screen support visible in FIG. 2.

According to one embodiment, the first cross member 56 comprises a first section T1 connected to the first limb 30 and a second hollow section T2, in which the first section T1 is able to slide in one direction of translation 61, and which is connected to the third limb 52. An immobilization system 62 is provided in order to immobilize the first and second sections T1 and T2 one in relation to the other. According to one embodiment, the immobilization system 62 is a pin 64 configured to be housed in transverse holes 66 provided at the level of the first and second sections T1 and T2. The first section T1 comprises a plurality of transverse holes 66 distributed over its length (as illustrated in FIG. 5) in order to permit the adjustment in length of the first cross member 56.

According to one configuration, the first cross member 56 is approximately perpendicular to the first limb 30.

Advantageously, the screen support 24 comprises first and second support runners 54, 54' disposed equidistantly from the first and second extremities 52.1, 52.2 of the third limb 52, moved as far apart as possible in order to reinforce the stability.

According to another characterizing feature, the third limb 52 comprises a first extremity 52.1 connected to the first cross member 56 and a second extremity 52.2, the length of the third limb (distance separating the first and second extremities 52.1 and 52.2) being equal to or greater than the width of the seat 10, and more specifically of the backrest 14.

According to one configuration, the third limb 52 comprises three portions 52T1, 52T2, 52T3, the first portion 52T1 extending from the first extremity 52.1 as far as the first support runner 54, the second portion 52T2 extending from the first support runner 54 as far as the second support runner 54', and the third portion 52T3 extending from the second support runner 54' as far as the second extremity 52.2.

The first and third portions 52T1 and 52T3 are substantially in alignment and are connected equidistantly from the upper and lower extremities of the support runners 54, 54'. The second portion 52T3 is offset in relation to the first and third portions 52T1 and 52T3 and connects the lower extremities of the support runners 54, 54'. This configuration makes it possible to clear the area between the support runners 54, 54'.

According to another characterizing feature, the support system 51 comprises:

a second cross member 68 which exhibits a first extremity 68.1 and a second extremity 68.2, a second articulation 70 which exhibits a second pivot axis A70 parallel to the first pivot axis A34, which connects the first extremity 68.1 of the second cross member 68 and the second extremity 30.1 or 32.2 of one of the first and second limbs 30, 32, a second closing mechanism 72 configured to adopt an attached state in which the second closing mechanism 72 connects the second extremity 68.2 of the cross member 68 and the second extremity 52.2 of the third limb 52 and a detached state in which the second closing mechanism 72 permits the second extremity 68.2 of the second cross member 68 and the second extremity 52.2 of the third limb 52 to move apart.

The second cross member 68 reinforces the rigidity of the third limb 52, which is retained at each of its extremities 68.1 and 68.2, and imparts a greater stability to the screen support 24.

According to one embodiment, the second articulation 70 comprises a yoke 74 provided at the first extremity 68.1 of the cross member 68 which is configured to house the second extremities 30.2, 32.2 of the first and second limbs 30, 32 as well as a cylinder 76 which forms the second pivot axis A70 and which is pivotably mounted in cylindrical seats provided at the level of the yoke 74 and of the second extremity 32.2 of the second limb 32.

According to one embodiment, the second closing mechanism 72 comprises:

a threaded rod 78, a third yoke 80 provided at the second extremity 68.2 of the second cross member 68, an axis of rotation 82 mounted pivotably on the third yoke 80, parallel to the second pivot axis A70 and attached to a first extremity of the threaded rod 78, a lug 84 attached to the second extremity 52.2 of the third limb 52, oriented perpendicularly to the third limb 52 and which exhibits a fork 86 configured to house the threaded rod 78, and a nut 88 configured to be screwed onto the threaded rod 78 in such a way as to retain the second closing mechanism 72 in the attached state.

Of course, the invention is not limited to these embodiments for the second articulation 70 and the second closing mechanism 72.

The screen support 24 similarly comprises an engagement system 90 integral with the third limb 52 and configured to permit the attachment, in a temporary manner, of a screen.

This configuration permits the attachment of the screen support 24 to a seat provided with a rear enclosure 20.

According to one embodiment, the engagement system 90 comprises a cylinder 92 which exhibits first and second extremities 92.1 and 92.2, first and second lugs 94, 94' which connect respectively the first and second extremities 92.1, 92.2 and the first and second support runners 54, 54' in order to move the cylinder 92 away from the rear enclosure 20. The cylinder 92 is disposed at the same height as the first and third portions 52T1 and 52T3 of the third limb 52.

Of course, the invention is not limited to this embodiment of the engagement system 90.

The operating principle of the screen support 24 is now described with respect to FIGS. 2 to 6:

Initially, the first and second closing mechanisms 36 and 72 are in the detached state. The second limb 32 is moved apart from the first limb 30, and the third limb 52 is disposed in the extension of the second limb 32.

The first limb 30 is inserted between the rods 18 and the rear enclosure 20 and is positioned in such a way that the cutouts 49 cooperate with the rods 18.

The second limb 32 is pressed against the first limb 30, and the closing mechanism 36 is positioned in the attached state.

The length of the first cross member 56 is adjusted in such a way that the support runners 54, 54' are in contact with the rear enclosure 20.

Finally, the second cross member 68 is pivoted until the second extremity 68.2 of the second cross member 68 is in contact with the lug 84 of the third limb 52 and the second closing mechanism 72 is positioned in the attached state.

The screen support 24 is henceforth joined in a stable manner to the backrest 14. A screen may then be attached via to the engagement system 90.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A screen support adapted for attaching a screen to a seat equipped with a headrest supported by rods and with a rear enclosure, the screen support comprising:

an attachment system configured to clamp the rods of the headrest of the seat and which comprises:
  first and second limbs, each having a length and comprising first and second extremities at ends of the lengths,
  a first articulation which connects the first extremities of the limbs,
  a first closing mechanism configured to adopt an attached state in which the first closing mechanism connects the second extremities of the first and second limbs and a detached state in which the first closing mechanism permits the first and second limbs to move apart,
  an engagement system configured to permit the temporary attachment of a screen, and
  a support system including a third limb, the third limb:
    connecting to the attachment system by a first cross member extending from a first end portion of the first limb, along a length of the first cross member, to a first end portion of the third limb and a second cross member extending from a second end portion of the first limb, along a length of the second cross member, to a second end portion of the third limb;
    extending along a length approximately parallel to the length of the first limb, but spaced from the first limb by the lengths of the cross members, the first cross member and the second cross member each having a width, defined by a first edge and a second edge, perpendicular to the length of the cross members, and being spaced from one another perpendicular to the lengths of the cross members by a gap configured to accommodate at least a portion of the seat therebetween; and
    including two support runners connected to the third limb, the support runners each having a length extending approximately perpendicular to the length of the third limb in a direction of the width of the cross members, and extending beyond each edge of the width of the cross members, and being laterally spaced apart from one another and configured to bear against the rear enclosure,
    the engagement system being connected to the third limb.

2. The screen support according to claim 1, further comprising a cross member that is adjustable in length and which connects the third limb and the first limb of the attachment system.

3. The screen support according to claim 1, wherein the support system comprises:
  a second cross member which exhibits a first extremity and a second extremity,
  a second articulation which connects the first extremity of the second cross member and the second extremity of one of the first and second limbs,
  a second closing mechanism configured to adopt an attached state in which the second closing mechanism connects the second extremity of the cross member and the second extremity of the third limb and a detached state in which the second closing mechanism permits the second extremity of the second cross member and the second extremity of the third limb to move apart.

4. The screen support according to claim 1, wherein each support runner comprises a rigid plate which exhibits a contact surface oriented towards the rear enclosure and a coating which at least partially covers the contact surface and which is made of a soft material in order not to mark the rear enclosure and adopt a form of the rear enclosure.

5. The screen support according to claim 1, wherein each support runner is rectangular with a long dimension and a short dimension and is oriented in such a way that the long dimension is perpendicular to the extent of the third limb which is approximately parallel to the first limb.

6. The screen support according to claim 1, wherein the two support runners comprises first and second support runners that are disposed equidistantly from the first and second extremities of the third limb.

7. The screen support according to claim 6, wherein the third limb comprises
  a first portion which extends from the first extremity of the third limb as far as the first support runner,
  a second portion which extends from the first support runner as far as the second support runner, and
  a third portion which extends from the second support runner as far as the second extremity of the third limb,
  wherein the first and third portions are substantially in alignment and are connected equidistantly from the upper and lower extremities of the support runners, and
  wherein the second portion is offset in relation to the first and third portions and connects the lower extremities of the support runners.

8. The screen support according to claim 6, wherein the engagement system comprises a cylinder which exhibits first and second extremities as well as first and second lugs which connect respectively the first and second extremities and the first and second support runners.

9. An aircraft seat comprising a screen support according to claim 1.

10. A screen support adapted for attaching a screen to a seat equipped a headrest supported by rods and with a rear enclosure, the screen support comprising:
  an attachment system configured to attach to the rods of the headrest of the seat and which comprises a first limb having a length and comprising first and second extremities at ends of the length,
  an engagement system configured to permit the temporary attachment of a screen, and
  a support system including a support limb, the support limb:
    connecting to the attachment system by a first cross member extending from a first end portion of the first limb along a length of the first cross member, to a first end portion of the support limb and a second cross member extending from a second end portion of the first limb, along a length of the second cross member, to a second end portion of the support limb;
    extending along a length approximately parallel to the length of the first limb, but spaced from the first limb by the lengths of the cross members, the first cross member and the second cross member each having a width, defined by a first edge and a second edge, perpendicular to the length of the cross members, and being spaced from one another perpendicular to the lengths of the cross members by a gap configured to accommodate at least a portion of the seat therebetween; and
    including two support runners connected to the support limb, the support runners each having a length extending approximately perpendicular to the length of the support limb in a direction of the width of the cross members, and extending beyond each edge of the width of the cross members, and being laterally spaced apart from one another and configured to bear against the rear enclosure, the engagement system being connected to the support limb.

11. The screen support according to claim 10, further comprising a cross member that is adjustable in length and which connects the support limb and the first limb of the attachment system.

12. The screen support according to claim 10, wherein the support system comprises:
   a second cross member which exhibits a first extremity and a second extremity,
   a second articulation which connects the first extremity of the second cross member and the second extremity of the first limb,
   a second closing mechanism configured to adopt an attached state in which the second closing mechanism connects the second extremity of the cross member and the second extremity of the support limb and a detached state in which the second closing mechanism permits the second extremity of the second cross member and the second extremity of the support limb to move apart.

13. The screen support according to claim 10, wherein each support runner comprises a rigid plate which exhibits a contact surface oriented towards the rear enclosure and a coating which at least partially covers the contact surface and which is made of a soft material to adopt a form of the rear enclosure.

14. The screen support according to claim 10, wherein each support runner is rectangular with a long dimension and a short dimension and is oriented in such a way that the long dimension is perpendicular to the extent of the support limb which is approximately parallel to the first limb.

15. The screen support according to claim 10, wherein the two support runners comprises first and second support runners that are disposed equidistantly from the first and second extremities of the support limb.

16. The screen support according to claim 15, wherein the support limb comprises
   a first portion which extends from the first extremity of the support limb as far as the first support runner,
   a second portion which extends from the first support runner as far as the second support runner, and
   a third portion which extends from the second support runner as far as the second extremity of the support limb,
   wherein the first and third portions are substantially in alignment and are connected equidistantly from the upper and lower extremities of the support runners, and
   wherein the second portion is offset in relation to the first and third portions and connects the lower extremities of the support runners.

17. The screen support according to claim 15, wherein the engagement system comprises a cylinder which exhibits first and second extremities as well as first and second lugs which connect respectively the first and second extremities and the first and second support runners.

18. An aircraft seat comprising a screen support according to claim 10.

* * * * *